(12) United States Patent
Yan

(10) Patent No.: US 10,915,141 B2
(45) Date of Patent: Feb. 9, 2021

(54) HEADBAND ADJUSTING DEVICE FOR WEARABLE DEVICE, HEADBAND, AND WEARABLE DEVICE

(71) Applicant: SZ DJI TECHNOLOGY CO., LTD., Shenzhen (CN)

(72) Inventor: Shaojun Yan, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/360,819

(22) Filed: Mar. 21, 2019

(65) Prior Publication Data
US 2019/0220056 A1    Jul. 18, 2019

Related U.S. Application Data

(63) Continuation of application No. PCT/CN2016/100264, filed on Sep. 27, 2016.

(51) Int. Cl.
*G02B 27/01* (2006.01)
*G06F 1/16* (2006.01)

(52) U.S. Cl.
CPC ......... *G06F 1/163* (2013.01); *G02B 27/0176* (2013.01)

(58) Field of Classification Search
CPC ..... A42B 3/145; A42B 3/122; Y10T 24/2187; Y10T 24/21; G02B 27/0176
(Continued)

(56) References Cited

U.S. PATENT DOCUMENTS 5,857,599 A * 1/1999 Palmer .................... F21L 15/14
                                                    2/422
8,434,200 B2 * 5/2013 Chen .................... A43C 11/165
                                                    2/418
(Continued)

FOREIGN PATENT DOCUMENTS

CN        203482936 U     3/2014
CN        203801842 U     9/2014
(Continued)

OTHER PUBLICATIONS

US 5,144,347 A, 11/2000, Mizoguchi et al. (withdrawn)
Wrld Intellectual Property Organization (WIPO) International Search Report for PCT/CN2016/100264 dated Jun. 28, 201 7 Pages

*Primary Examiner* — Adam J Waggenspack
(74) *Attorney, Agent, or Firm* — Anova Law Group, PLLC

(57) ABSTRACT

A headband adjusting device includes a mounting base including an internal ratchet, a linkage mounted on the mounting base. The linkage includes a transmission member and an elastic position limiting member configured to abut against a tooth of the internal ratchet. The headband adjusting device also includes a thumbwheel connected with the linkage and configured to cause the linkage to rotate, the thumbwheel including a disengaging member corresponding to the position limiting member. When the thumbwheel rotates in a first direction, the disengaging member abuts against the position limiting member to unlock the internal ratchet. When the thumbwheel rotates in a second direction, the position limiting member rotates while contacting the internal ratchet. The headband adjusting device further includes a transmission mechanism coupled with the transmission member. The linkage is configured to drive the transmission mechanism, which drives a headband to extend or retract.

20 Claims, 9 Drawing Sheets

(58) Field of Classification Search
USPC .......................................................... 224/181
See application file for complete search history.

(56) References Cited

U.S. PATENT DOCUMENTS

| | | |
|---|---|---|
| 2005/0262619 A1 | 12/2005 | Musal et al. |
| 2009/0211385 A1* | 8/2009 | Fiquepron ............... A43C 11/14 74/422 |
| 2010/0281604 A1* | 11/2010 | Grim ....................... A42B 3/145 2/417 |
| 2015/0059065 A1* | 3/2015 | Klotz ........................ A42B 1/22 2/418 |
| 2017/0055856 A1* | 3/2017 | Noh .................... A61B 5/02233 |

FOREIGN PATENT DOCUMENTS

| | | |
|---|---|---|
| CN | 204147239 U | 2/2015 |
| CN | 105476200 A | 4/2016 |
| CN | 205214327 U | 5/2016 |
| CN | 205234925 U | 5/2016 |
| CN | 205250551 U | 5/2016 |
| CN | 105661735 A | 6/2016 |
| CN | 206096630 U | 4/2017 |

* cited by examiner

HEADBAND ADJUSTING DEVICE FOR WEARABLE DEVICE, HEADBAND, AND WEARABLE DEVICE

CROSS-REFERENCE TO RELATED APPLICATION

This application is a continuation application of International Application No. PCT/CN2016/100264, filed on Sep. 27, 2016, the entire contents of which are incorporated herein by reference.

TECHNICAL FIELD

The present disclosure relates to the technology field of wearable devices and, more particularly, to a headband adjusting device for a wearable device, a headband, and a wearable device, such as wearable video eye glasses.

BACKGROUND

In currently technologies, virtual reality ("VR") wearable glasses, such as video glasses, are becoming increasingly popular and widely used. Such wearable glasses (e.g., video glasses) are much bulkier and heavier than conventional eye glasses. Therefore, the wearable glasses cannot be mounted to a user's head through a conventional eye glasses frame.

The current technologies include two methods for mounting a headband to a head: soft headband method and hard headband method. In the soft headband method, an elastic band and a hook and loop strap may be used. This type of headband uses soft materials. The soft headband can fit the head well. However, the soft headband may apply a pressure to the head due to the tightness of the headband, which can cause discomfort to the user over time, and can become loose over time. In the hard headband method, some of the issues associated with the soft headband can be resolved. The hard headband uses a material of high strength and provides more comfort to the user. However, the head headband still faces issues such as inconvenience in adjusting the tightness.

SUMMARY

In accordance with the present disclosure, there is provided a headband adjusting device. The headband adjusting device includes a mounting base including an internal ratchet. The headband adjusting device also includes a linkage mounted on the mounting base, the linkage including a transmission member and at least one elastic position limiting member configured to abut against a tooth of the internal ratchet. The headband adjusting device also includes a thumbwheel connected with the linkage and configured to cause the linkage to rotate, the thumbwheel including a disengaging member corresponding to the position limiting member. When the thumbwheel rotates in a first direction, the disengaging member abuts against the position limiting member causing the position limiting member to disengage from the internal ratchet to unlock the internal ratchet. When the thumbwheel rotates in a second direction opposite the first direction, the position limiting member rotates while contacting the internal ratchet. The headband adjusting device further includes a transmission mechanism coupled with the transmission member. The linkage is configured to drive the transmission mechanism, and the transmission mechanism is configured to drive a headband to extend or retract.

In accordance with the present disclosure, there is also provided a headband including a body and a headband adjusting device. The headband adjusting device includes a mounting base having an internal ratchet and a linkage mounted on the mounting base. The linkage includes a transmission member and at least one elastic position limiting member configured to abut against a tooth of the internal ratchet. The headband adjusting device also includes a thumbwheel connected with the linkage and configured to cause the linkage to rotate, the thumbwheel including a disengaging member corresponding to the position limiting member. When the thumbwheel rotates toward in a first direction, the disengaging member abuts against the position limiting member causing the position limiting member to disengage from the internal ratchet to unlock the internal ratchet. When the thumbwheel rotates in a second direction opposite the first direction, the position limiting member rotates while contacting the internal ratchet. The headband adjusting device further includes a transmission mechanism coupled with the transmission member. The linkage is configured to drive the transmission mechanism, and the transmission mechanism is configured to drive the headband to extend or retract. Two ends of the transmission mechanism are coupled with the body. The headband adjusting device and the body are coupled with one another to define a receiving chamber.

In accordance with the present disclosure, there is further provided a wearable device including an eye glasses body, a headband including a headband body connected with the eye glasses body, and a headband adjusting device including a mounting base having an internal ratchet and a linkage mounted on the mounting base. The linkage includes a transmission member and at least one elastic position limiting member configured to abut against a tooth of the internal ratchet. The headband adjusting device also includes a thumbwheel connected with the linkage and configured to cause the linkage to rotate. The thumbwheel includes a disengaging member corresponding to the position limiting member. When the thumbwheel rotates in a first direction, the disengaging member abuts against the position limiting member causing the position limiting member to disengage from the internal ratchet to unlock the internal ratchet. When the thumbwheel rotates in a second direction opposite the first direction, the position limiting member rotates while contacting the internal ratchet. The headband adjusting device also includes a transmission mechanism coupled with the transmission member. The linkage is configured to drive the transmission mechanism, and the transmission mechanism is configured to drive the headband to extend or retract. The headband adjusting device is mounted on the headband body.

The technology disclosed in the present disclosure has advantages over the conventional technologies. According to the present disclosure, a position limiting member is locked to an internal ratchet. The headband has a stable position and size, which makes it less susceptible to becoming loose. When adjusting the size of the headband, a disengaging member of a thumbwheel abuts against the position limiting member, causing the position limiting member to release the locking of the internal ratchet. The thumbwheel and a linkage piece can cause the headband to retract or extend in two directions, corresponding to tightening the headband and loosening the headband. Thus, the adjustment of the headband can be conveniently carried out. Further, the headband adjusting device is pivotably connected with a main body of the headband. A volume of a space defined by the headband can be changed by adjusting the headband adjusting device, thereby providing enhanced comfort and flexibility for fitting different users.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

Figure 1:
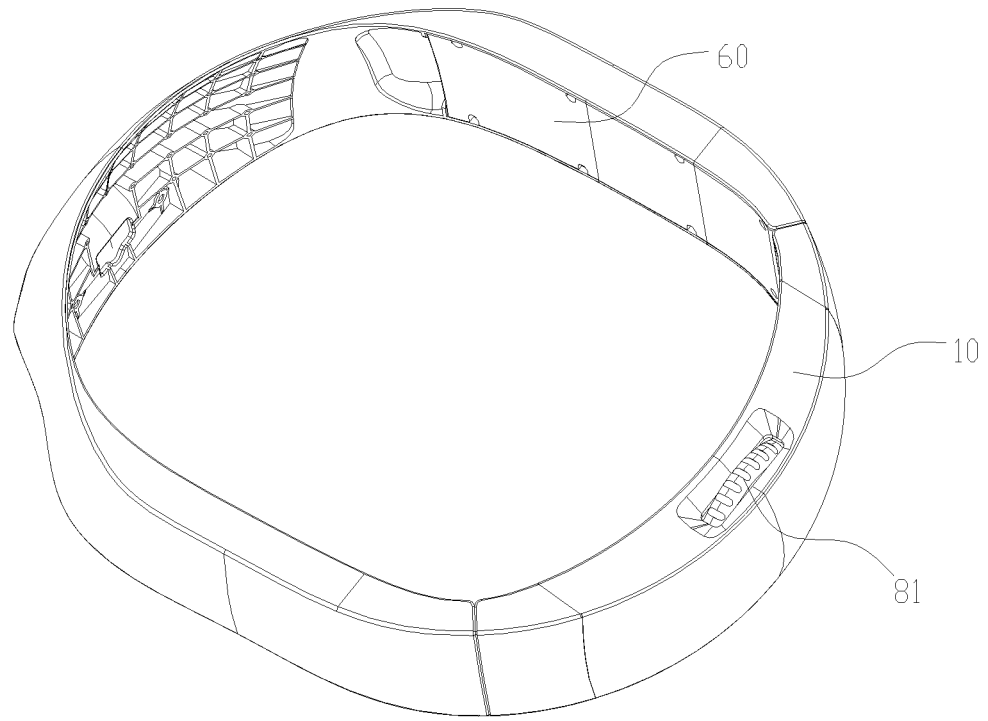
FIG. 1 is a perspective view of a headband that can be used in a wearable device such as wearable video eye glasses, according to an example embodiment.

| LIST OF ELEMENTS | |
|---|---|
| Mounting base | 10 |
| Internal ratchet | 11 |
| Ratchet teeth | 111 |
| Opening | 12 |
| Concave surface | 13 |
| Mounting shaft | 14 |
| Linkage | 20 |
| Position limiting member | 21 |
| Elastic member | 211 |
| Locking member | 212 |
| Boss | 213 |
| Rotatable boss | 22 |
| Transmission member | 23 |
| Gear | 231 |
| Open slot | 24 |
| Thumbwheel | 30 |
| Disengaging member | 31 |
| Linkage slot | 32 |
| Rotation space | 33 |
| Damper | 40 |
| Transmission mechanism | 50 |
| First teeth strap | 51 |
| First extended slot | 511 |
| First meshing teeth | 512 |
| Second teeth strap | 52 |
| Second extended slot | 521 |
| Second meshing teeth | 522 |
| Headband body | 60 |
| Mounting member | 61 |
| Connecting member | 62 |

-continued

| LIST OF ELEMENTS | |
|---|---|
| Cover plate | 70 |
| Guiding slot | 71 |
| Guiding shaft | 72 |
| Eye glasses body | 80 |
| Headband adjusting device | 81 |

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Example embodiments will be described with reference to the accompanying drawings, in which the same numbers refer to the same or similar elements unless otherwise specified.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "left," "right," "up," "upward," "upwardly," "down," "downward," "downwardly," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed. The term "communicatively coupled" indicates that related items are coupled or connected through a communication chancel, such as a wired or wireless communication channel.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The following descriptions explain example embodiments of the present disclosure, with reference to the accompanying drawings. Unless otherwise noted as having an obvious conflict, the embodiments or features included in various embodiments may be combined.

The following embodiments do not limit the sequence of execution of the steps included in the disclosed methods. The sequence of the steps may be any suitable sequence, and certain steps may be repeated.

Figure 2:
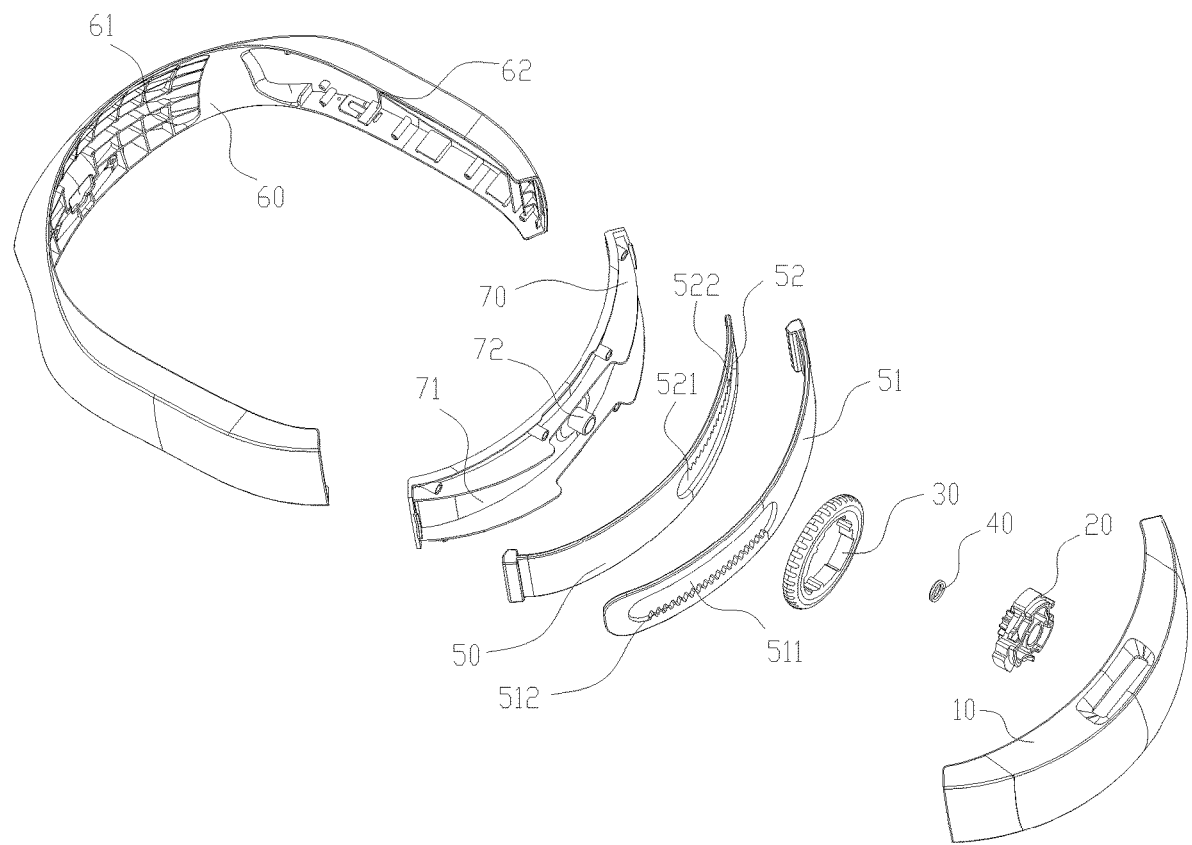
FIG. 2 is an exploded view of the headband according to an example embodiment.
Figure 9:
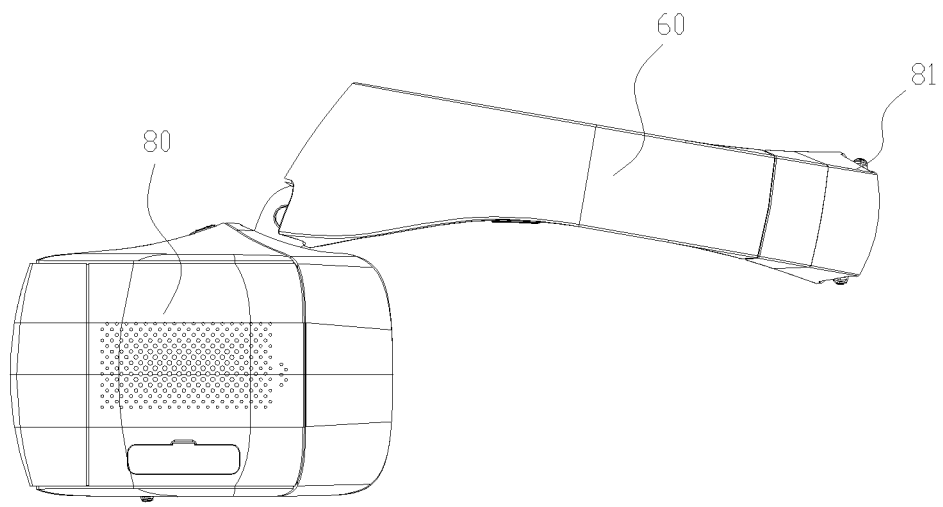
FIG. 9 is a schematic diagram of the structure of a wearable device such as wearable video eye glasses according to an example embodiment.

FIGS. 1, 2, and 9 show a headband according to example embodiments of the present disclosure. The headband may be included in wearable devices, such as wearable eye glasses, e.g., wearable video eye glasses. The headband may include a headband body 60 and a headband adjusting device 81. The headband adjusting device 81 may include a transmission mechanism 50. Two ends of the transmission mechanism 50 may be pivotably coupled with the headband body 60. The headband adjusting device 81 and the headband body 60 may be coupled together to define or enclose a receiving chamber. The headband body 60 and a mounting base 10 of the headband adjusting device 81 may form a ring-shaped headband. The receiving chamber includes a space surrounded by the headband, and may be configured to receive a head of a user.

In some embodiments, the headband body 60 includes a mounting member 61 and two connecting members 62 respectively coupled to two ends of the mounting member 61. The transmission mechanism 50 may be pivotably coupled with the two connecting members 62. In some embodiments, the mounting member 61 may be configured for mounting an eye glasses body 80. In some embodiments, the headband body 60 may have a U shape. In some embodiments, the headband body 60 may have a fixed shape, and may be configured to stably mount the eye glasses body 80. In some embodiments, the deformation of the headband body 60 may be small. As a result, the headband body 60 forms a hard headband having a stable shape and being comfortable to wear. In some embodiments, the transmission mechanism 50 may be pivotably coupled with the two connecting members, forming an enclosed receiving chamber. In some embodiments, the eye glasses body 80 may be mounted on the mounting member 61. The headband adjusting device 81 may be configured to adjust a position of the mounting base 10. In some embodiments, the transmission mechanism 50 that is pivotably coupled with the two connecting members 62 may pivotably rotate around a pivoting joint, causing the mounting base 10 to move away from or closer to the glasses body 80. As a result, the tightness of the headband may be conveniently adjusted.

FIGS. 3-8 show embodiments of a headband adjusting device 81 that may be used in wearable devices, such as wearable glasses, e.g., wearable video eye glasses. The headband adjusting device may include a mounting base 10, a linkage 20, a thumbwheel 30, and a transmission mechanism 50. In some embodiments, the mounting base 10 may include an internal ratchet 11. In some embodiments, the internal ratchet 11 may include a plurality of ratchet teeth 111. The ratchet teeth 111 may be disposed along a clockwise direction or a counter-clockwise direction. In some embodiments, the linkage 20 may be mounted on the mounting base 10. The linkage 20 may be rotatable around an axis. In some embodiments, the linkage 20 may include a transmission member 23 and at least one elastic position limiting member 21. The at least one elastic position limiting member 21 may be configured to abut against the ratchet teeth 111 of the internal ratchet 11. In some embodiments, the linkage 20 may include a plurality of position limiting members 21, such as two, three, four, etc., which may be uniformly distributed on the linkage 20. The uniformly distributed position limiting members 21 may balance the forces experienced by the linkage 20 and may increase the tight locking force and the elastic force. In some embodiments, the thumbwheel 30 and the linkage 20 are coupled with one another. The rotation of the thumbwheel 30 may cause the linkage 20 to rotate. In some embodiments, the thumbwheel 30 may include a disengaging member 31 corresponding to the position limiting member 21. In some embodiments, when the thumbwheel 30 rotates in one direction, the disengaging member 31 abuts against the position limiting member 21 causing the position limiting member 21 to release the locking of the internal ratchet 11. When the thumbwheel 30 rotates in another direction, the position limiting member 21 rotates while contacting the internal ratchet 11. The transmission mechanism 50 and the transmission member 23 are coupled together such that motion in one may cause motion in another. The linkage 20 may rotate to cause the transmission mechanism 50 to extend or retract toward both ends of the transmission mechanism 50.

In an initial state, the internal ratchet 11 is mounted on the mounting base 10. When the thumbwheel 30 rotates to a predetermined position and stops rotating, the at least one position limiting member 21 of the linkage 20 may abut against the ratchet teeth 111. The internal ratchet 11 and the position limiting member 21 of the linkage 20 may lock the thumbwheel 30. The transmission mechanism 50 may fix the position of the mounting base 10. The ratchet teeth 111 may limit the rotation capability of the linkage 20. The relative position between the mounting base 10 and the headband body 60 may be stable. The size of the headband may satisfy requirement for wearing on a user's head. Thus, the disclosed headband has improved stability and wearing comfort.

The headband adjusting device 81 may be adjusted by a user based on the following operations: the thumbwheel 30 is rotated in a first direction such that the disengaging member 31 abuts against the position limiting member 21. The disengaging member 31 presses the position limiting member 21 to cause the position limiting member 21 to bend, causing the position limiting member 21 to unlock the ratchet teeth 111. The thumbwheel 30 continues to cause the linkage 20 to rotate. The transmission member 23 of the linkage 20 causes the transmission mechanism 50 to extend or retract, which causes the mounting base 10 to move and adjust the relative position relative to the headband body 60 as the transmission mechanism 50 moves. The structures enable convenient unlocking and adjustment. Because the ratchet teeth 111 are distributed in a clockwise direction or a counter-clockwise direction, when the thumbwheel 30 causes the linkage 20 to rotate in a second direction (which may opposite the first direction), the linkage 20 may cause the position limiting member 21 to slide along the ratchet teeth 111. The transmission member 23 may cause the transmission mechanism 50 to extend or retract, thereby adjusting the volume of the receiving chamber located between the mounting base 10 and the headband body 60. The thumbwheel 30 may cause the linkage 20 to rotate in one direction or another to tighten or loosen the headband, thereby increasing the comfort of the headband and the flexibility of fitting different users. Because the internal ratchet 11 can be locked in one direction only, pressing the mounting base 10 can achieve quick extension or retraction.

Figure 6:
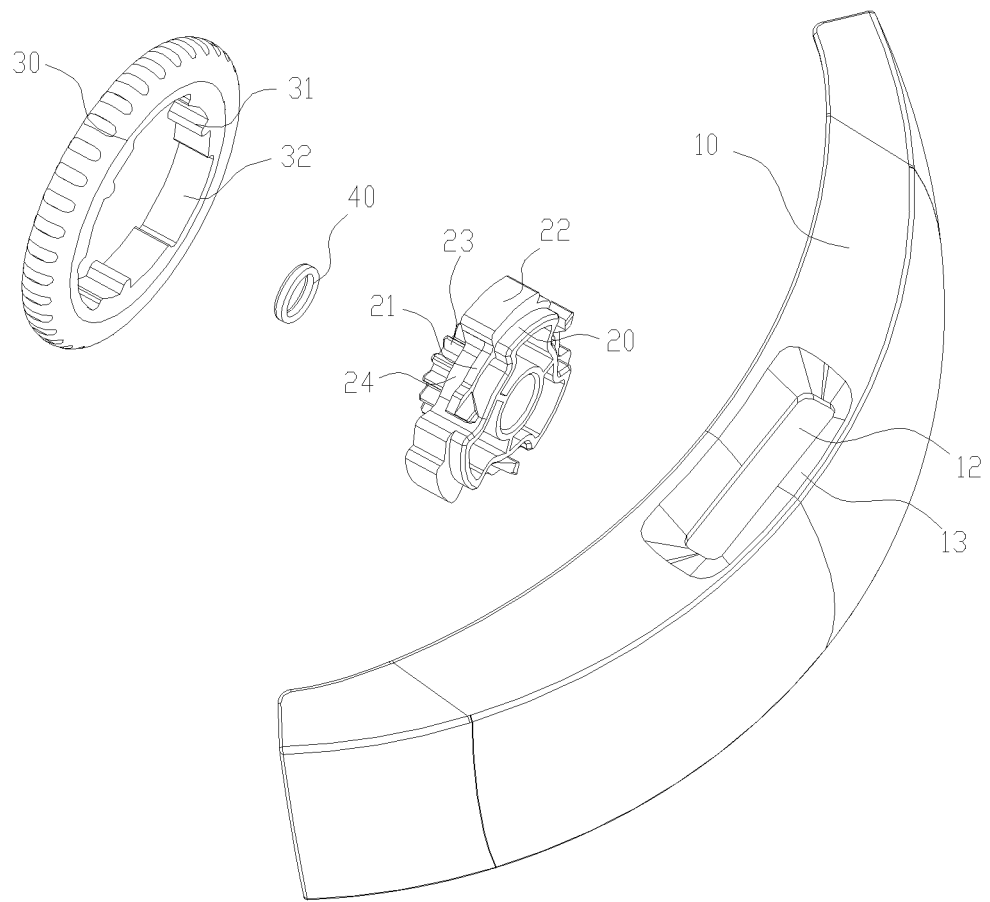
FIG. 6 is an exploded view of the headband adjusting device, according to an example embodiment.
Figure 7:
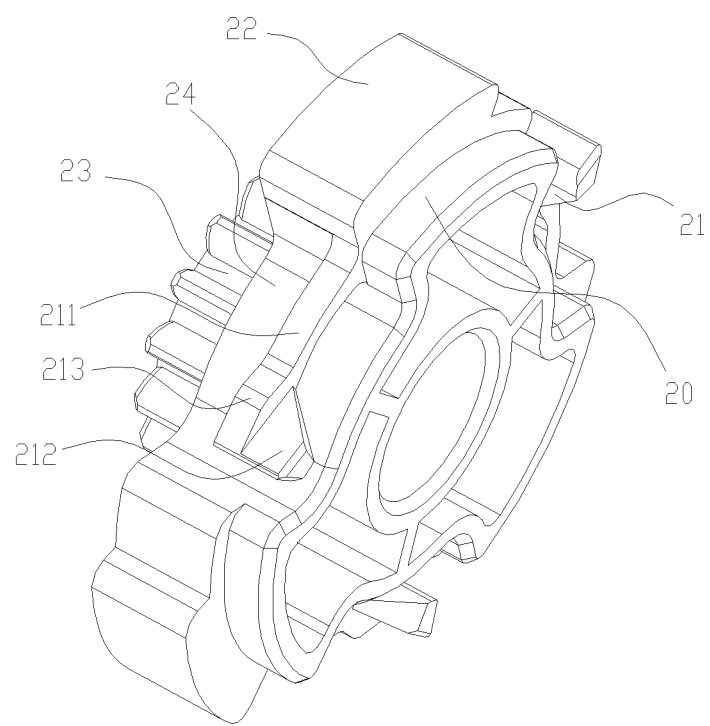
FIG. 7 is a perspective view of a linkage according to an example embodiment.
Figure 8:
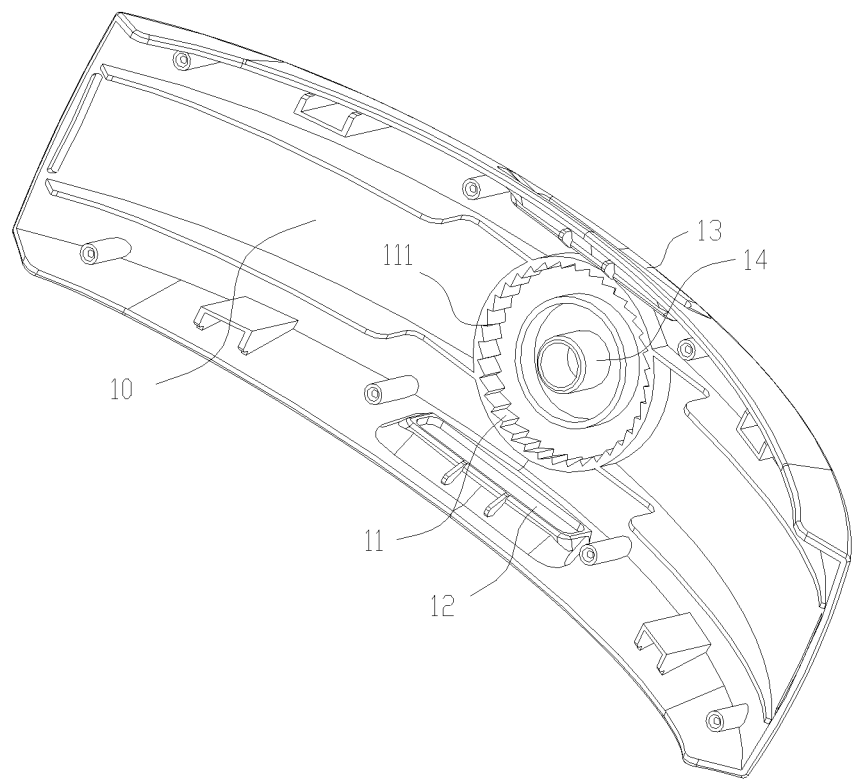
FIG. 8 is a perspective view of a mounting base of a headband adjusting device according to an example embodiment.

As shown in FIGS. 6 and 7, the position limiting member 21 may include an elastic member 211 and a locking member 212 disposed on the elastic member 211. The locking member 212 may protrude along an axis of the linkage 20. The locking member 212 may abut against the internal ratchet 11. The elastic member 211 may be abutted, causing the locking member 212 to disengage from the internal ratchet 11.

In some embodiments, the position limiting member 21 may be provided with the elastic member 211. The elastic member 211 may have a cantilever shape and may undergo elastic deformations. The locking member 212 may protrude along an axis of the linkage 20, and may be disposed on the elastic member 211. This structure increases the movable range of the position limiting member 21 and enhances the flexibility of the configuration of the linkage 20. In some embodiments, the locking member 212 may protrude from a side wall where the linkage 20 is located. As a result, the locking member 212 does not interfere with the rotation of the linkage 20. The locking member 212 may have a shape that matches the shape of the ratchet teeth 111. The locking member 212 and the internal ratchet 11 may lock together, making it convenient to engage with the internal ratchet 11 and flexible to rotate the linkage 20.

In some embodiments, the mounting base 10 may be provided with a concave surface 13 and an opening 12 located at an end of the concave surface 13. The concave surface 13 may be formed by depression of an outer surface of the mounting base 10. The outer peripheral surface of the thumbwheel 30 may be located out of the concave surface 13. By providing the concave surface 13 and the opening 12, the area of the contact surface between the thumbwheel 30 and a user's finger can be increased. In addition, the diameter of the thumbwheel 30 may be reduced, thereby reducing the size of the mounting base 10. The surface area of the protruding portion of the thumbwheel 30 that protrudes out of the mounting base 10 may be reduced, increasing the aesthetics.

In some embodiments, the elastic member 211 may include a boss 213 protruding along a radial direction of the linkage 20. A slope may be disposed at a joint between the boss 213 and the elastic member 211. In some embodiments, the locking member 212 and the boss 213 may be disposed in parallel, or may be interlaced with one another. The disengaging member 31 may be disposed on an inner wall of the thumbwheel 30 protruding from the inner wall. When a thumbwheel 30 is rotated, the disengaging member 31 may abut against the boss 213, causing the locking member 212 to disengage from the internal ratchet 11.

In some embodiments, the disengaging member 31 may have a curved surface. As the thumbwheel 30 is rotated, a surface of the disengaging member 31 may slidably abut the boss 213 while closely contacting the elastic member 211. Alternatively, the disengaging member 31 may rotate to the slope and slide along the slope to abut against the boss 213. The height of the boss 213 may be greater than the locking height between the locking member 212 and the ratchet teeth 111. In some embodiments, the disengaging member 31 may abut against the boss 213, and the elastic member 211 may deform to cause the boss 213 to retract toward an axis of the linkage 20. The locking member 212 may disengage from the internal ratchet 11, and the thumbwheel 30 may cause the linkage 20 to rotate. In some embodiments, the disengaging member 31 abuts against the position limiting member 21 to cause elastic deformations. As a result, the stability and reliability are enhanced.

Figure 5:
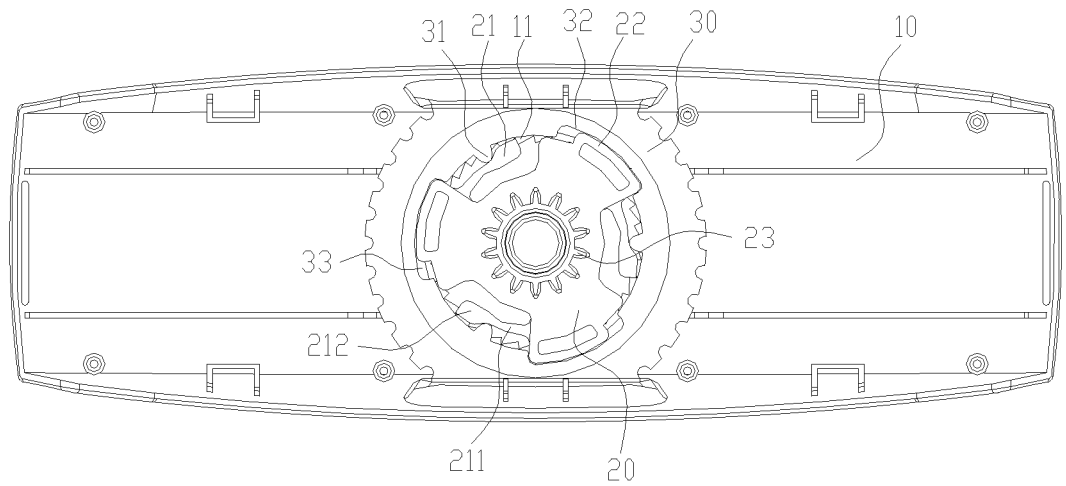
FIG. 5 is a front view of the headband adjusting device, according to an example embodiment.

As shown in FIG. 5, in some embodiments, the thumbwheel 30 may include at least one linkage slot 32. The linkage 20 may include a rotatable boss 22 corresponding to the linkage slot 32. The rotatable boss 22 may be received in the linkage slot 32. When the thumbwheel 30 is rotated, a slot wall of the linkage slot 32 may abut against the rotatable boss 22. Through this configuration, the thumbwheel 30, when rotated, may cause the linkage 20 to rotate. This configuration can sustain a large rotational torque, and can increase the reliability of the connection. By engaging the linkage slot 32 and the rotatable boss 22, the connection location of the linkage slot 32 and the rotatable boss 22 is constant and fixed, which makes the assembling process convenient and consistent.

In some embodiments, a rotation space 33 may be provided between the rotatable boss 22 and the linkage slot 32. When the thumbwheel 30 rotates in the rotation space 33, the disengaging member 31 may abut against the position limiting member 21. In some embodiments, the center angle of the rotation space 33 is equal to the center angle of an arc corresponding to the curve along which the disengaging member 31 slides along the elastic member 211 to the boss 213.

In some embodiments, a width of the linkage slot 32 is greater than a width of the rotatable boss 22. When the disengaging member 31 is to unlock the position limiting member 21, the thumbwheel 30 rotates along the rotation space 33 until it abuts against a side wall of the rotatable boss 22. In the meantime, the disengaging member 31 rotates to abut against the boss 213, causing the position limiting member 21 to unlock the ratchet teeth 111, which enables to thumbwheel 30 and the linkage 20 to continue to rotate. In some embodiments, the rotation space 33 may provide a space needed for the disengaging member 31 to slide to the boss 213 when the disengaging member 31 unlocks the position limiting member 21. Various components are disposed within the space between the rotatable boss 22 and the linkage slot 32. This arrangement is compact. When the thumbwheel 30 causes the linkage 20 to rotate in another direction, a side wall of the linkage slot 32 directly contacts the rotatable boss 22, causing the linkage 20 to rotate.

As shown in FIG. 7, the linkage 20 may include an open slot 24 configured to receive the position limiting member 21. The open slot 24 may provide a space for the translation of the position limiting member 21 when the position limiting member 21 is abutted. In some embodiments, the open slot 24 sinks along a longitudinal direction of an outer surface of the linkage 20. The elastic member 211 of the position limiting member 21 may protrude from a side wall of the open slot 24. The extension direction of the elastic member 211 may be along a tangent direction of the linkage 20. Alternatively, the elastic member 211 may tilt on a side wall of the open slot 24. In some embodiments, the boss 213 may protrude toward an outer surface of the linkage 20. A displacement space may be provided between the elastic member 211 and an open slot 24. In some embodiments, a height of the displacement space is greater than a maximum displacement of the boss 213. The configuration of the open slot 24 enables the position limiting member 21 to be disposed in the linkage 20, thereby reducing the overall size of the linkage 20. As a result, the size of the headband may be reduced.

As shown in FIG. 2, the mounting base 10 may include a mounting shaft 14. An axis of the mounting shaft 14 may coincide with an axis of the internal ratchet 11. In some embodiment, the linkage 20 may be inserted onto the mounting shaft 14. In some embodiment, the mounting shaft 14 may share the same shaft with the internal ratchet 11. In some embodiment, the linkage 20 may be mounted on the mounting shaft 14, and the position limiting member 21 may abut against the internal ratchet 11 to lock it. In some embodiment, when the linkage 20 rotates, the position limiting member 21 may abut against the ratchet teeth 111 one by one, which increases the stability of the rotation for of the linkage 20.

In some embodiment, the transmission mechanism 50 may include a first teeth strap 51 and a second teeth strap 52. In some embodiment, the transmission member 23 of the linkage 20 may include a gear 231. The gear 231 may engage with the first teeth strap 51 and the second teeth strap 52. In some embodiment, the first teeth strap 51 and the second teeth strap 52 may include first meshing teeth 512 and second meshing teeth 522, respectively. In some embodiment, the linkage 20 may cause the first teeth strap 51 and the second teeth strap 52 to extend or retract.

In some embodiment, the transmission mechanism 50 may include, but is not limited to, the transmission between the teeth strap and the gear. The transmission mechanism 50 may include other suitable connections, such as connections between a chain and a sprocket, a cam and a follower, and a wheel and a belt, etc. The present disclosure uses the transmission between the teeth strap and the gear as an example to explain the principles of the disclosed technology.

In some embodiments, the gear 231 may be meshed with the first meshing teeth 512 and the second meshing teeth 522 simultaneously. The gear 231 may cause the first teeth strap 51 and the second teeth strap 52 to extend or retract in both directions. Because the first teeth strap 51 and the second teeth strap 52 are pivotably connected with two ends of the headband 60 and cannot move, the mounting base 10 may move toward eye glasses body 80 when the first teeth strap 51 and the second teeth strap 52 retract, thereby reducing the volume of the receiving chamber to adjust the headband to fit the user's head with comfort. The mounting base 10 may move away from the eye glasses body 80 when the first teeth strap 51 and the second teeth strap 52 extend, thereby enlarging the volume of the receiving chamber. A user may then take the headband off from the head. The wear and the adjustment of the disclosed headband are convenient.

Figure 3:
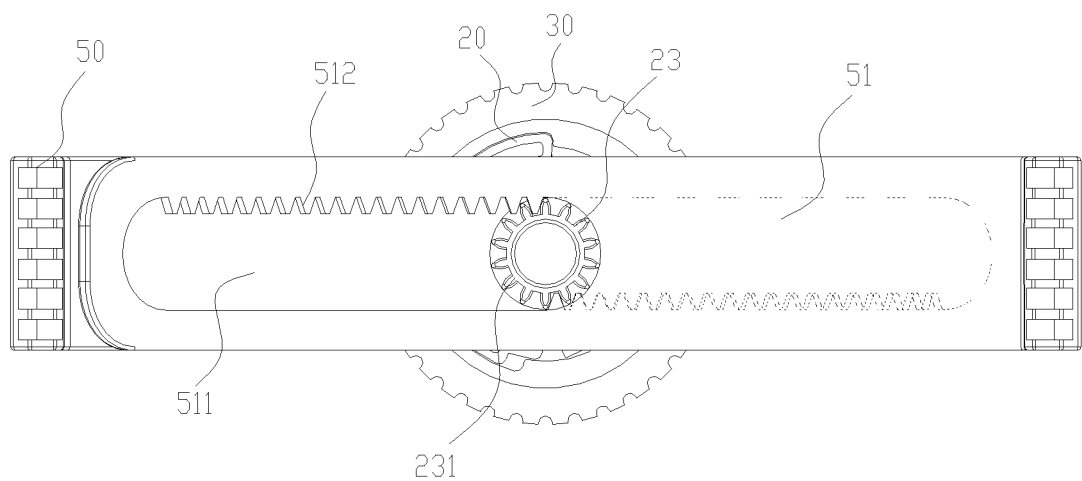
FIG. 3 is schematic illustration of a thumbwheel and a transmission mechanism included in the headband of a wearable device, according to an example embodiment.
Figure 4:
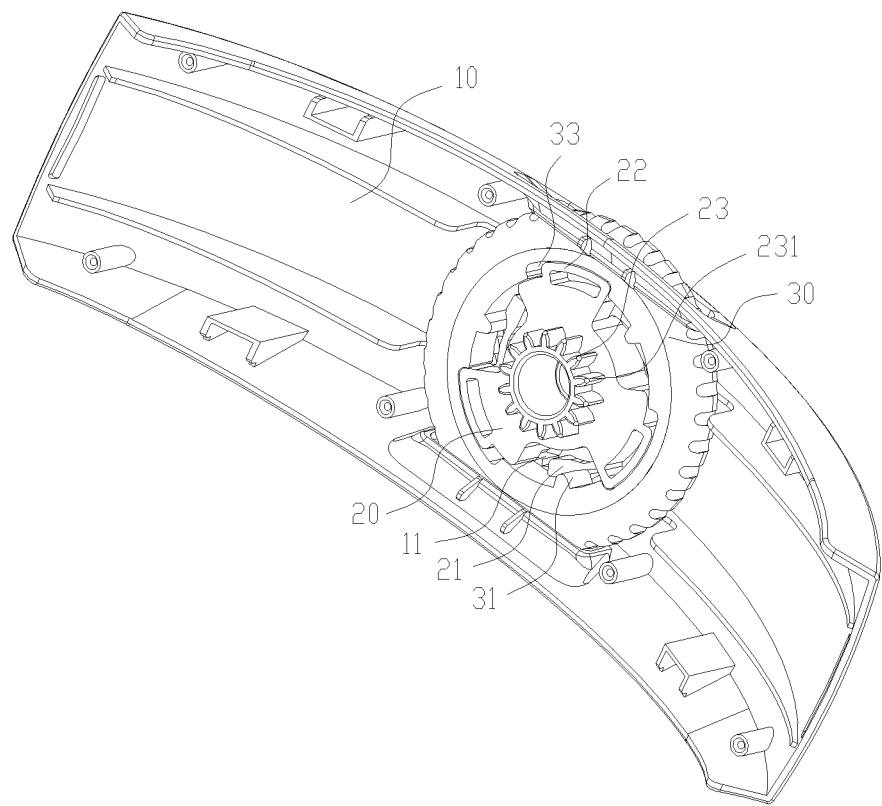
FIG. 4 is a perspective view of a headband adjusting device, according to an example embodiment.

As shown in FIGS. 2 and 3, in some embodiments, the first teeth strap 51 and the second teeth strap 52 may include a first extended slot 511 and a second extended slot 521, respectively. The first meshing teeth 512 may be disposed in the first extended slot 511, and the second meshing teeth 522 may be disposed in the second extended slot 521. The gear 231 may be meshed with the first meshing teeth 512 and the second meshing teeth 522 simultaneously and respectively.

In some embodiments, the first teeth strap 51 and the second teeth strap 52 may be engaged with one another. The gear 231 may pass through the first extended slot 511 and the second extended slot 521 to mesh with the first meshing teeth 512 and the second meshing teeth 522 simultaneously and respectively, thereby reducing the space needed for mounting the first teeth strap 51 and the second teeth strap 52. This configuration increases the compactness of the device, reduces the overall size of the transmission mechanism 50, and makes it convenient to use in an environment that provides small mounting spaces.

In some embodiments, the first meshing teeth 512 are disposed on a longitudinal inner wall of the first extended slot 511, and the second meshing teeth 522 are disposed on a longitudinal inner wall of the second extended slot 521. The first meshing teeth 512 and the second meshing teeth 522 may be located vertically relative to one another to mesh with the gear 231.

In some embodiments, the first meshing teeth 512 and the second meshing teeth 522 may be provided on a first inner wall of the first extended slot 511 and the second extended slot 521, respectively. A second inner wall facing the first inner wall on which the first meshing teeth 512 and the second meshing teeth 522 are disposed may be a straight wall. In some embodiments, when the second inner wall tangentially contact the gear 231, the gear 231 is stable and the swing amplitude is small. When only one inner wall is provided with the first meshing teeth 512 and the second meshing teeth 522 vertically relative to each other to mesh with the gear 231, the synchronicity between the first teeth strap 51 and the second teeth strap 52 can be enhanced. The amount of displacement remains the same, and the force distribution on the gear 231 is uniform. This configuration increases the stability of operation of the device.

In some embodiments, the first teeth strap 51 and the second teeth strap 52 may be disposed vertically in two directions, and both may be engaged with the gear 231. When the thumbwheel 30 is rotated, the gear 231 may cause the first teeth strap 51 and the second teeth strap 52 to move in opposite directions, thereby adjusting the size (e.g., volume) of the receiving chamber of the headband to tighten or loosen the headband.

As shown in FIG. 2 and FIG. 3, in some embodiments, a damper 40 may be mounted between the mounting base 10 and the linkage 20. For example, the damper 40 may be mounted between the gear 231 and the mounting base 10. The damper 40 may include a soft rubber material, such as a rubber ring or other types of elastic component. Providing the damper 40 may reduce or eliminate a gap that may be created between the gear 231 and the transmission mechanism 50 during the meshing process, thereby increasing the stability of the rotation. The damper 40 may provide a frictional resistance force, increasing the hand-felt comfort when a user operates the thumbwheel.

In some embodiments, the mounting base 10 may include a cover plate 70 located relative to the internal ratchet 11. The cover plate 70 may include a guiding slot 71. The transmission mechanism 50 may be restrained in the guiding slot 71. The cover plate 70 may include a guiding shaft 72. The damper 40 may be mounted on the guiding shaft 72. The gear 231 may be inserted into the first extended slot 511 and the second extended slot 521. The guiding shaft 72 may be inserted into the gear 231 along an axis of the gear 231. The damper 40 may abut against the gear 231. The guiding slot 71 may be disposed on both side of the guiding shaft 72. Two outer walls of the first teeth strap 51 and the second teeth strap 52 are restrained in the guiding slot 71. The gear 231, when rotating, causes the first teeth strap 51 and the second teeth strap 52 to extend or retract along the guiding shaft 72 and the guiding slot 71. This configuration improves the guiding characteristics and the stability of the moving direction.

As shown in FIG. 9, an example wearable device, such as a wearable video eye glasses, may include an eye glasses body 80 and a headband. The headband may include a headband body 60 connected with the glasses body 80. The eye glasses body 80 may be provided with a video eye glasses body. The headband adjusting device 81 may be provided on the headband body 60. In some embodiments, after being mounted to the headband body 60, the eye glasses body 80 and the headband adjusting device 81 are disposed at two ends of the receiving chamber relative to one another. For example, the eye glasses body 80 may be mounted to a front end of the headband body 60, and the headband adjusting device 81 may be mounted to a rear end of the headband body 60. In operation, the headband may tightly fit onto a user's head. Rotating the headband adjusting device 81 may cause the headband adjusting device 81 to cause the transmission mechanism 50 to extend or retract in both directions. As a result, the mounting base 10 may move to change the size of the receiving chamber. The eye glasses body 80 may be comfortably fitted onto a user's head. The adjustment of the eye glasses body 80 may be conveniently performed using the headband adjusting device 81.

The disclosed methods and devices are described in detail. Examples are used to explain the principles and operations of the various embodiments. The descriptions of the embodiments are only for the purpose of explaining the methods and devices of the present disclosure. A person having ordinary skill in the art can modify or improve the various features of the present disclosure without departing from the principle of the various embodiments disclosed herein. Such modification or improvement also fall within the scope of the present disclosure. When no obvious conflict is created, various features shown in various embodiments may be combined in a single embodiment. The descriptions of the various embodiments in this specification are not intended to limit the scope of the present disclosure.

Other embodiments of the present disclosure will be apparent to those skilled in the art from consideration of the specification and practice of the embodiments disclosed herein. It is intended that the specification and examples be considered as example only and not to limit the scope of the present disclosure, with a true scope and spirit of the invention being indicated by the following claims. Variations or equivalents derived from the disclosed embodiments also fall within the scope of the present disclosure.

What is claimed is:

1. A headband adjusting device, comprising:
 a mounting base comprising an internal ratchet;
 a linkage mounted on the mounting base, the linkage comprising a transmission member and at least one elastic position limiting member configured to abut against a tooth of the internal ratchet to lock a rotation of the linkage in a first direction without locking a rotation of the linkage in a second direction that is opposite to the first direction, the position limiting member including:
  an elastic member; and
  a locking member protruding from a surface of the elastic member that is perpendicular to a rotation axis of the transmission member and extending along the rotation axis of the transmission member, the locking member and the transmission member being located at two opposite sides of the elastic member in a direction parallel to the rotation axis of the transmission member;
 a thumbwheel connected with the linkage and configured to cause the linkage to rotate around the rotation axis of the transmission member, the thumbwheel comprising a disengaging member corresponding to the position limiting member, wherein when the thumbwheel rotates in the first direction, the disengaging member abuts against the position limiting member causing the position limiting member to disengage from the internal ratchet to unlock the internal ratchet, and when the thumbwheel rotates in the second direction, the position limiting member rotates while contacting the internal ratchet; and
 a transmission mechanism coupled with the transmission member, wherein the linkage is configured to drive the transmission mechanism, and the transmission mechanism is configured to drive a headband to extend or retract.

2. The headband adjusting device of claim 1,
 wherein the locking member is configured to abut against the internal ratchet, and the elastic member is configured to be abutted to cause the locking member and the internal ratchet to disengage from one another.

3. The headband adjusting device of claim 2,
 wherein the elastic member comprises a boss protruding in a radial direction of the linkage, and the disengaging member protrudes from an inner wall of the thumbwheel, and
 wherein the thumbwheel is rotatable to cause the disengaging member to abut against the boss, causing the locking member to disengage from the internal ratchet.

4. The headband adjusting device of claim 3, wherein the thumbwheel comprises a linkage slot, the linkage comprises a rotatable boss, the rotatable boss being disposed in the linkage slot.

5. The headband adjusting device of claim 1, wherein the linkage comprises an open slot configured to receive the position limiting member, the open slot providing a space for translation of the position limiting member when the position limiting member is abutted.

6. The headband adjusting device of claim 1, wherein the mounting base comprises a mounting shaft, wherein an axis of the mounting shaft coincides with an axis of the internal ratchet, and the linkage is inserted onto the mounting shaft.

7. The headband adjusting device of claim 6, further comprising:
 a damper mounted between the mounting base and the linkage.

8. The headband adjusting device of claim 1, wherein the transmission mechanism comprises:
 a first teeth strap comprising first meshing teeth; and
 a second teeth strap comprising second meshing teeth,
 wherein the transmission member is a gear configured to engage with the first teeth strap and the second teeth strap, and
 wherein the linkage is rotatable to cause the first teeth strap and the second teeth strap to extend or retract.

9. The headband adjusting device of claim 8,
 wherein the first teeth strap comprises a first extended slot, the second teeth strap comprises a second extended slot,
 wherein the first meshing teeth are disposed in the first extended slot, the second teeth are disposed in the second extended slot, and wherein the gear is configured to respectively engage with the first meshing teeth and the second teeth simultaneously.

10. The headband adjusting device of claim 1, wherein the mounting base comprises a cover plate, the cover plate comprises a guiding slot, and the transmission mechanism is configured to be restrained in the guiding slot.

11. A headband, comprising:
a body; and
a headband adjusting device, comprising:
   a mounting base comprising an internal ratchet;
   a linkage mounted on the mounting base, the linkage comprising a transmission member and at least one elastic position limiting member configured to abut against a tooth of the internal ratchet to lock a rotation of the linkage in a first direction without locking a rotation of the linkage in a second direction that is opposite to the first direction, the position limiting member including:
      an elastic member; and
      a locking member protruding from a surface of the elastic member that is perpendicular to a rotation axis of the transmission member and extending along the rotation axis of the transmission member, the locking member and the transmission member being located at two opposite sides of the elastic member in a direction parallel to the rotation axis of the transmission member;
   a thumbwheel connected with the linkage and configured to cause the linkage to rotate around the rotation axis of the transmission member, the thumbwheel comprising a disengaging member corresponding to the position limiting member, wherein when the thumbwheel rotates toward in the first direction, the disengaging member abuts against the position limiting member causing the position limiting member to disengage from the internal ratchet to unlock the internal ratchet, and when the thumbwheel rotates in the second direction, the position limiting member rotates while contacting the internal ratchet; and
   a transmission mechanism coupled with the transmission member, wherein the linkage is configured to drive the transmission mechanism, and the transmission mechanism is configured to drive the headband to extend or retract,
   wherein two ends of the transmission mechanism are coupled with the body, and
   wherein the headband adjusting device and the body are coupled with one another to define a receiving chamber.

12. The headband of claim 11,
wherein the locking member is configured to abut against the internal ratchet, and the elastic member is configured to be abutted to cause the locking member and the internal ratchet to disengage.

13. The headband of claim 12,
wherein the elastic member comprises a boss protruding in a radial direction of the linkage, and the disengaging member protrudes from an inner wall of the thumbwheel, and
wherein the thumbwheel is rotatable to cause the disengaging member to abut against the boss, causing the locking member to disengage from the internal ratchet.

14. The headband of claim 13, wherein the thumbwheel comprises a linkage slot, the linkage comprises a rotatable boss, the rotatable boss being disposed in the linkage slot.

15. The headband of claim 11, wherein the linkage comprises an open slot configured to receive the position limiting member, the open slot providing a space for translation of the position limiting member when the position limiting member is abutted.

16. The headband of claim 11, wherein the transmission mechanism comprises:
a first teeth strap comprising first meshing teeth; and
a second teeth strap comprising second meshing teeth,
wherein the transmission member includes a gear configured to engage with the first meshing teeth strap and the second teeth strap, and
wherein the linkage is rotatable to cause the first teeth strap and the second teeth strap to extend or retract.

17. The headband of claim 11, wherein the mounting base comprises a cover plate, the cover plate comprises a guiding slot, and the transmission mechanism is configured to be restrained in the guiding slot.

18. The headband of claim 11, wherein the body comprises a mounting member and two connecting members mounted to two ends of the mounting member, and wherein the transmission mechanism is pivotably coupled with the two connecting members.

19. A wearable device, comprising:
an eye glasses body;
a headband comprising a headband body connected with the eye glasses body; and
a headband adjusting device, comprising:
   a mounting base comprising an internal ratchet;
   a linkage mounted on the mounting base, the linkage comprising a transmission member and at least one elastic position limiting member configured to abut against a tooth of the internal ratchet to lock a rotation of the linkage in a first direction without locking a rotation of the linkage in a second direction that is opposite to the first direction, the position limiting member including:
      an elastic member; and
      a locking member protruding from a surface of the elastic member that is perpendicular to a rotation axis of the transmission member and extending along the rotation axis of the transmission member, the locking member and the transmission member being located at two opposite sides of the elastic member in a direction parallel to the rotation axis of the transmission member;
   a thumbwheel connected with the linkage and configured to cause the linkage to rotate around the rotation axis of the transmission member, the thumbwheel comprising a disengaging member corresponding to the position limiting member, wherein when the thumbwheel rotates toward in the first direction, the disengaging member abuts against the position limiting member causing the position limiting member to disengage from the internal ratchet to unlock the internal ratchet, and when the thumbwheel rotates in the second direction, the position limiting member rotates while contacting the internal ratchet; and
   a transmission mechanism coupled with the transmission member, wherein the linkage is configured to drive the transmission mechanism, and the transmission mechanism is configured to drive the headband to extend or retract,
wherein the headband adjusting device is mounted on the headband body.

20. The headband adjusting device of claim 1, wherein:
the internal ratchet includes a plurality of ratchet teeth inclinedly disposed along the second direction, an addendum line of each of the plurality of ratchet teeth being parallel to the rotation axis of the transmission member;
the at least one position limiting member is configured to abut against one of the plurality of ratchet teeth;
a rotation of the thumbwheel and an engagement between the ratchet teeth and the linkage cause the linkage to:
be locked from rotation in the first direction; and
rotate in the second direction without being locked.

* * * * *